US008816608B2

(12) United States Patent
Terasaka et al.

(10) Patent No.: US 8,816,608 B2
(45) Date of Patent: Aug. 26, 2014

(54) POWER SUPPLY DEVICE, LUMINAIRE AND POWER SOURCE SYSTEM

(75) Inventors: Hiroshi Terasaka, Yokosuka (JP); Toshihiko Sasai, Yokosuka (JP); Naoko Iwai, Yokosuka (JP)

(73) Assignee: Toshiba Lighting & Technology Corporation, Kanagawa (JP)

( * ) Notice: Subject to any disclaimer, the term of this patent is extended or adjusted under 35 U.S.C. 154(b) by 125 days.

(21) Appl. No.: 13/410,076

(22) Filed: Mar. 1, 2012

(65) Prior Publication Data

US 2013/0002169 A1 Jan. 3, 2013

(30) Foreign Application Priority Data

Jul. 1, 2011 (JP) ................................ 2011-147048

(51) Int. Cl.
*G06F 1/00* (2006.01)
*H05B 37/02* (2006.01)
*H05B 39/04* (2006.01)
*H05B 41/36* (2006.01)

(52) U.S. Cl.
USPC ............................ 315/307; 315/291; 315/360

(58) Field of Classification Search
USPC ........... 315/307, 291, 297, 306; 323/234–303
See application file for complete search history.

(56) References Cited

U.S. PATENT DOCUMENTS

2006/0091826 A1 5/2006 Chen
2009/0085495 A1* 4/2009 Yamauchi et al. ............ 315/291
2011/0085495 A1* 4/2011 Ko et al. ....................... 370/328
2012/0194100 A1* 8/2012 Iwai et al. ..................... 315/307
2013/0127368 A1* 5/2013 Soma et al. .................. 315/287
2013/0141018 A1* 6/2013 Kamii ........................... 315/360

FOREIGN PATENT DOCUMENTS

CN 1942035 A 4/2007
CN 101400204 A 4/2009
CN 102067733 A 5/2011
JP 2009-152153 7/2009
JP 2011198524 A 10/2011
WO 2009156590 A1 12/2009

OTHER PUBLICATIONS

European Search Report dated Oct. 17, 2012 for European Patent Application No. EP 12157845, 3 pages.
China Office Action dated Feb. 27, 2014 for Application No. 201210078684.8.

* cited by examiner

*Primary Examiner* — Alexander H Taningco
*Assistant Examiner* — Dylan White
(74) *Attorney, Agent, or Firm* — Patterson & Sheridan LLP.

(57) ABSTRACT

According to one embodiment, a luminaire includes a lighting circuit configured to light a light source with a power supply from the outside, an accumulated-lighting-time storing section configured to store accumulated lighting time of the light source, and a control circuit configured to control the lighting circuit in a set mode. The control circuit sets, if a pattern for turning on and off the power supply from the outside is a predetermined initial illuminance correction setting pattern, a mode in an initial illuminance correction mode for performing initial illuminance correction corresponding to the accumulated lighting time of the light source. The control circuit sets, if the pattern for turning on and off the power supply from the outside is a predetermined normal setting pattern, the mode in a normal mode for not performing the initial illuminance correction.

10 Claims, 3 Drawing Sheets

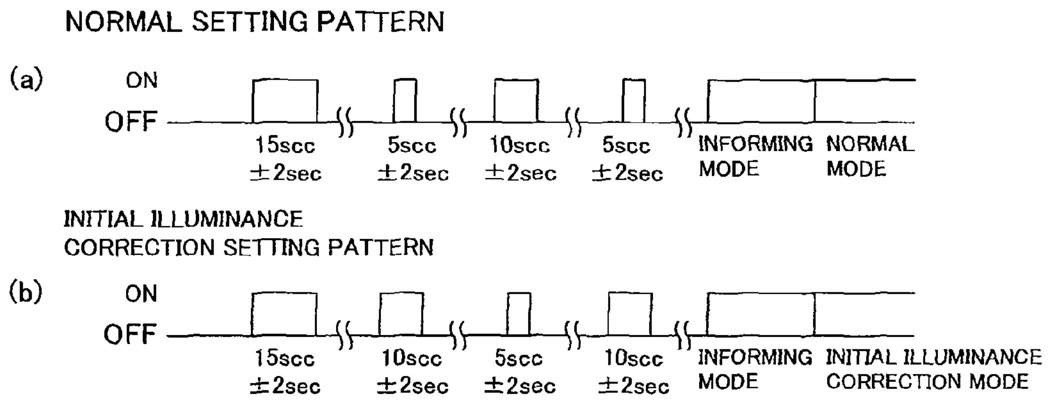
FIG. 3
| POWER ON AND OFF OPERATION | FIRST TIME | SECOND TIME | THIRD TIME | FOURTH TIME |
|---|---|---|---|---|
| NORMAL SETTING PATTERN ON TIME(sec) | 15 | 5 | 10 | 5 |
| INITIAL ILLUMINANCE CORRECTION SETTING PATTERN ON TIME(sec) | 15 | 10 | 5 | 10 |
| SITUATION | SET MODE SWITCHING OPERATION | DETERMINE MODE | CHECK | |
FIG. 4
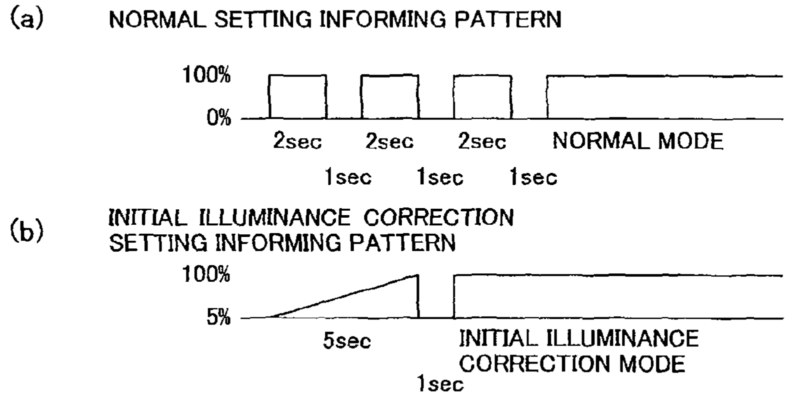
FIG. 5

POWER SUPPLY DEVICE, LUMINAIRE AND POWER SOURCE SYSTEM

INCORPORATION BY REFERENCE

The present invention claims priority under 35 U.S.C. §119 to Japanese Patent Application No. 2011-147048 filed on Jul. 1, 2011. The content of the application is incorporated herein by reference in their entirety.

FIELD

Embodiments described herein relate generally to a luminaire including an initial illuminance correcting function.

BACKGROUND

In general, in a light source such as a discharge lamp or an LED element, brightness is the highest during the start of use and gradually falls according to the accumulation of lighting time. Therefore, there is a luminaire including an initial illuminance correcting function for suppressing brightness during the start of use of a light source to thereby substantially fix brightness from the start of use until the end of the life of the light source and realize power saving.

Such a luminaire is set in a state in which it is set in advance whether initial illuminance correction corresponding to accumulated lighting time of the light source is performed. If brightness is insufficient in the setting for performing the initial illuminance correction because of, for example, a situation of use of the luminaire, the setting can be switched to the setting for not performing the initial illuminance correction.

In the past, in the case of a luminaire including a dimmer, there is a luminaire that releases the initial illuminance correction according to specific operation of the dimmer.

However, in the case of a luminaire not including the dimmer, the initial illuminance correction may be unable to be easily released. It is difficult to designate and set whether the initial illuminance correction is performed.

Therefore, there is a demand for a luminaire in which it is possible to easily set whether the initial illuminance correction is performed and it is possible to designate and set whether the initial illuminance correction is performed.

BRIEF DESCRIPTION OF THE DRAWINGS

FIGS. 3(*a*) and 3(*b*) are timing charts of a pattern for turning on and off a power supply in order to set the modes of the luminaire, wherein FIG. 3(*a*) is a timing chart of a normal setting pattern and FIG. 3(*b*) is a timing chart of an initial illuminance correction setting pattern;

FIG. 4 is a table of a relation between the normal setting pattern and the initial illuminance correction setting pattern and mode switching of the luminaire;

FIGS. 5(*a*) and 5(*b*) are timing charts of a pattern for controlling an output of a light source when the modes of the luminaire are set and informing the setting of the modes, wherein FIG. 5(*a*) is a timing chart of a normal setting informing pattern and FIG. 5(*b*) is a timing chart of an initial illuminance correction setting informing pattern;

DETAILED DESCRIPTION

According to one embodiment, a luminaire includes: a lighting circuit configured to light a light source with a power supply from the outside; an accumulated-lighting-time storing section configured to store accumulated lighting time of the light source; and a control circuit configured to control the lighting circuit in a set mode. The control circuit sets, if a pattern for turning on and off the power supply from the outside is a predetermined initial illuminance correction setting pattern, a mode in an initial illuminance correction mode for performing initial illuminance correction corresponding to the accumulated lighting time of the light source. The control circuit sets, if the pattern for turning on and off the power supply from the outside is a predetermined normal setting pattern, the mode in a normal mode for not performing the initial illuminance correction.

With the luminaire, it is possible to easily set, by turning on and off the power supply for the luminaire, the initial illuminance correction mode or the normal mode for not performing the initial illuminance correction. It is possible to designate and set the initial illuminance correction mode or the normal mode by selecting the initial illuminance correction setting pattern or the normal setting pattern and turning on and off the power supply for the luminaire according to whether the initial illuminance correction mode is set or the normal mode is set.

An embodiment is explained below with reference to FIGS. 1 to 7.

Figure 1:
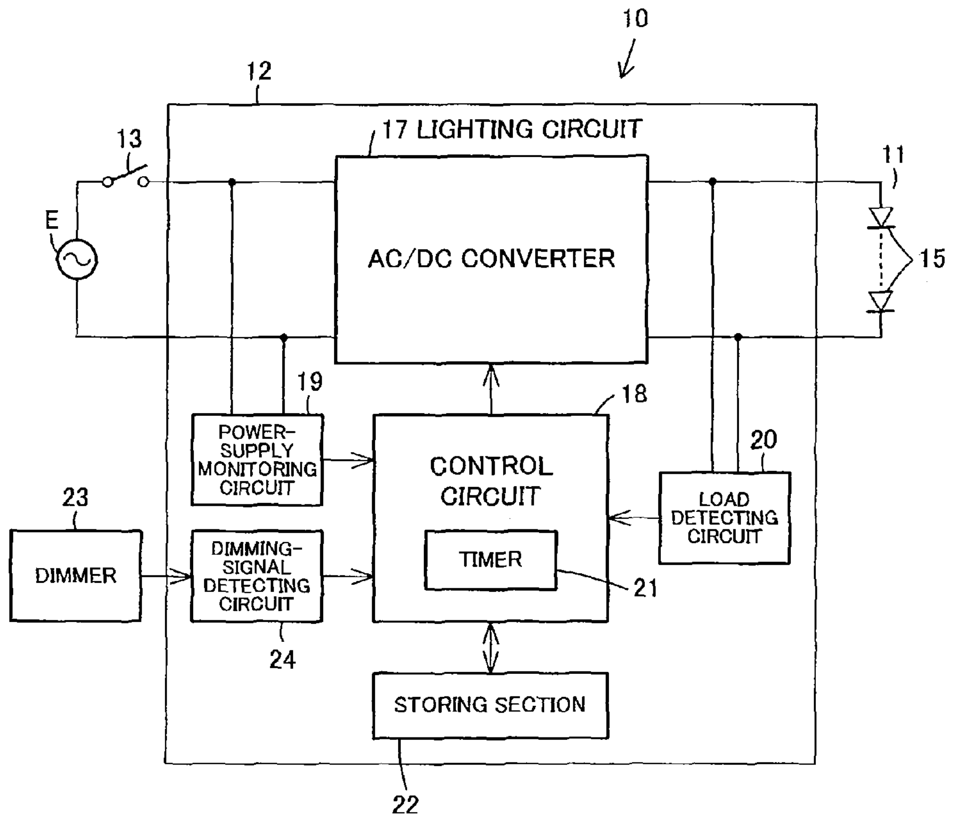
FIG. 1 is a circuit diagram of a luminaire according to an embodiment.

As shown in FIG. 1, a luminaire 10 includes a light source 11 and a lighting unit 12 that lights the light source 11. A commercial alternating-current power supply E is supplied to the luminaire 10 as a power supply according to turn-on of a switch 13 such as a wall switch. One luminaire 10 may be connected to the switch 13 or plural luminaires 10 may be connected to the switch 13.

The light source 11 includes, for example, plural LED elements 15. The light source 11 may be a light source of any form such as a straight tube type lamp form including caps at both ends, a bulb-type form including a screw cap, or a flat-type lamp form including a GX-type cap. The light source 11 may be detachably attachable to the luminaire 10 or may be integrated with the luminaire 10. In the case of the luminaire 10 in which the LED elements 15 are used in the light source 11, in general, the life of the luminaire 10 is about 40,000 hours and attenuation of a luminous flux at the end of the life with respect to a luminous flux in the beginning is about 70% to 80%.

The lighting unit 12 includes a lighting circuit 17 as an AC/DC converter that rectifies and smoothes alternating-current power from the commercial alternating-current power supply E, converts the alternating-current power into predetermined direct-current power according to a switching action of a switching element of a chopper circuit, and outputs the direct-current power to the light source 11 and a control circuit 18 that controls ON and OFF of the switching element of the lighting circuit 17.

A power-supply monitoring circuit 19 that monitors power-on and power-off is connected to a power supply input side of the lighting circuit 17. During the power-on, the power-supply monitoring circuit 19 outputs a power-on signal to the control circuit 18.

A load detecting circuit 20 is connected to a direct-current power output side of the lighting circuit 17. When the light source 11 is connected to the lighting unit 12, the load detecting circuit 20 outputs a load detection signal to the control circuit 18.

The control circuit 18 includes a function of a timer 21 for performing timing while the power-on signal from the power-supply monitoring circuit 19 is input. A storing section 22 functioning as an accumulated-lighting-time storing section that stores, as accumulated lighting time of the light source 11, time counted by the timer 21 while the power-on signal from the power-supply monitoring circuit 19 is input is connected to the control circuit 18. As the storing section 22, for example, a nonvolatile memory that keeps stored contents even during the power-off is used. If the light source 11 can be replaced, the accumulated lighting time stored in the storing section 22 can be reset during the replacement of the light source 11.

A dimming-signal detecting circuit 24, to which a dimming signal from a dimmer 23 set on a wall surface or the like together with the switch 13 is input, is connected to the control circuit 18. The dimming-signal detecting circuit 24 outputs the dimming signal to the control circuit 18.

The control circuit 18 can switch and set a mode in an initial illuminance correction mode for performing initial illuminance correction corresponding to the accumulated lighting time of the light source 11 and a normal mode (a non-initial illuminance correction mode) for not performing the initial illuminance correction. The control circuit 18 controls the lighting circuit 17 in the set mode.

Figure 6:
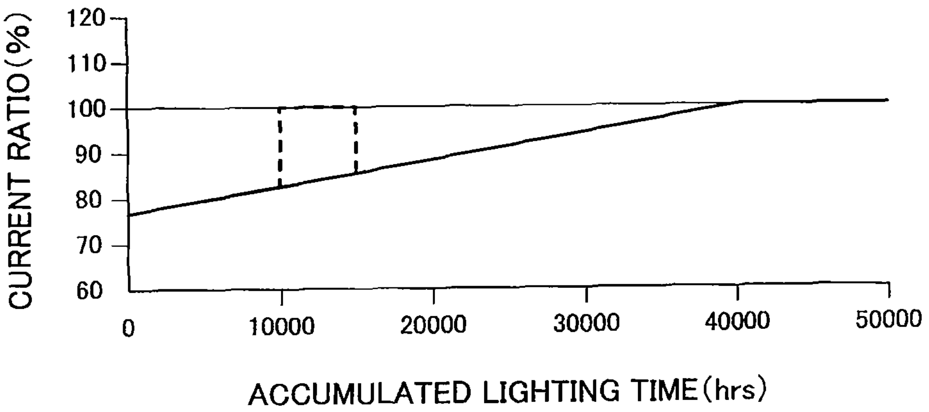
FIG. 6 is a graph of a relation between accumulated lighting time and a current ratio of the luminaire.

In the initial illuminance correction mode, as indicated by a solid line in a graph of FIG. 6, in the case of the light source 11 in which the LED elements 15 having the characteristics explained above are used, a current ratio is set to 70% to 80% in the beginning when the accumulated lighting time is 0 hour and the current ratio is set to 100% after 40,000 hours elapses. The current ratio linearly transitions between 70% to 80% and 100%. The current ratio is a ratio to a current value during full lighting (100%) of the light source 11. According to the initial illuminance correction mode, the light source 11 lights at substantially fixed brightness from the beginning until the end of the life of the power supply 11.

In the normal mode, the light source 11 can light at the current ratio of 100% irrespective of the accumulated lighting time.

The control circuit 18 includes a function of continuously subjecting the lighting circuit 17 to dimming control according to the dimming signal input from the dimmer 23 during the initial illuminance correction mode and during the normal mode. As shown in a graph of FIG. 7, in the case of the light source 11 in which the LED elements 15 having the characteristics explained above are used, the dimming ratio can be arbitrarily set between 5% and 100%. The current ratio linearly transitions according to the dimming ratio of 5% to 100%. The light source 11 is continuously dimmed.

Figure 7:
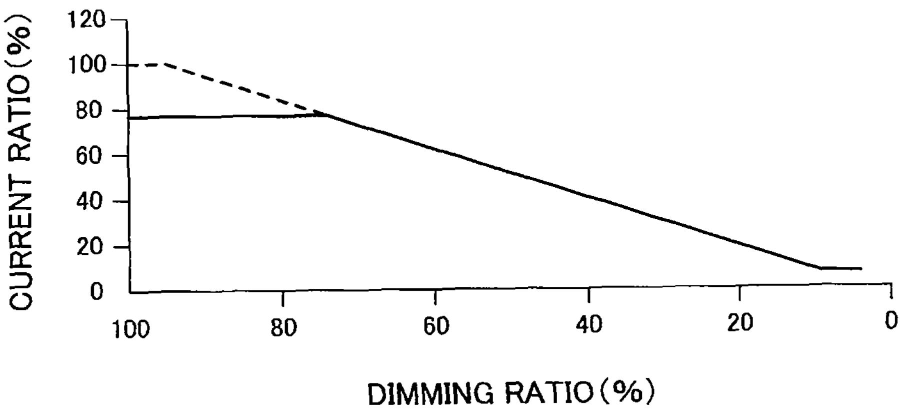
FIG. 7 is a graph of a relation between a dimming ratio and the current ratio of the luminaire.

During the setting of the initial illuminance correction mode, as indicated by a solid line in the graph of FIG. 7, an upper limit of the current ratio is limited to 70% to 80% by the initial illuminance correction and is not controlled to exceed 70% to 80%. During the setting of the normal mode, as indicated by a broken line in the graph of FIG. 7, the upper limit of the current ratio is not limited by the initial illuminance correction and can be controlled to 100%. The continuous dimming may be able to be performed both during the initial illuminance correction mode and during the normal mode. Alternatively, the continuous dimming may be able to be performed only during the normal mode and unable to be performed in the initial illuminance correction mode.

The control circuit 18 includes a function of setting, when the commercial alternating-current power supply E is turned on and off by the switch 13, the mode in the initial illuminance correction mode if an on-off pattern of the commercial alternating-current power supply E is the predetermined initial illuminance correction setting pattern and setting the mode in the normal mode if the on-off pattern of the commercial alternating-current power supply E is the predetermined normal setting pattern. Specifically, the control circuit 18 includes a pattern determining circuit that compares the on-off pattern of the commercial alternating-current power supply E and the initial illuminance correction setting pattern and the normal setting pattern set in advance and determines a pattern and a mode setting circuit that sets a mode corresponding to the set pattern. The initial illuminance correction setting pattern and the normal setting pattern serving as references of the pattern determination are stored in the storing section 22 in advance.

An example of the normal setting pattern is shown in FIG. 3(*a*). The commercial alternating-current power supply E is turned on for 15 seconds (first time), turned off, turned on for 5 seconds (second time), turned off, turned on for 10 seconds (third time), turned off, turned on for 5 seconds (fourth time), and turned off by the switch 13. An example of the initial illuminance correction setting pattern is shown in FIG. 3(*b*). The commercial alternating-current power supply E is turned on for 15 seconds (first time), turned off, turned on for 10 seconds (second time), turned off, turned on for 5 seconds (third time), turned off, turned on for 10 seconds (fourth time), and turned off by the switch 13. The ON time is set in a range with a margin of ±2 seconds taking into account operation fluctuation of components used in the lighting unit 12. The control circuit 18 times the ON time with the timer 21 and causes the storing section 22 to store the ON time at any time.

In FIG. 4, a table in which time and a situation in every number of times of power-on in each of the modes are summarized is shown in FIG. 4. In the first turn-on for 15 seconds, the control circuit 18 sets mode switching operation. In the second turn-on, if the commercial alternating-current power supply E is turned on for 5 seconds, the control circuit 18 determines that the pattern is switched to the normal setting pattern. If the commercial alternating-current power supply E is turned on for 10 seconds, the control circuit 18 determines that the pattern is switched to the initial illuminance correction setting pattern. The third turn-on and subsequent turn-on are turn-on for further confirmation of the determined modes.

If time of power-on not satisfying setting time is inserted halfway in the power-on and the power-off in the patterns or if power-on and power-off operation in the patterns is not completed within a predetermined reception time such as 1 minutes, the control circuit 18 initializes (cancels) the present determination of the pattern. If the power-on and power-off operation is not performed from the beginning of the patterns, the control circuit 18 does not receive the determination of the pattern. Consequently, it is possible to prevent the mode from being changed by unintended operation of the switch 13.

Distinction of the setting patterns is not limited to these examples. Other setting patterns may be distinguished. For example, when the luminaire 10 includes a battery, OFF time can be counted. Therefore, setting patterns including the OFF time may be distinguished.

If the initial illuminance correction setting pattern is set, the control circuit 18 controls the lighting circuit 17 in an initial illuminance correction setting informing pattern to change an output of the light source 11. If the normal setting pattern is set, the control circuit 18 controls the lighting circuit 17 in a normal setting informing pattern different from the initial illuminance correction setting informing pattern to change the output of the light source 11. In this way, the control circuit 18 includes an informing function for informing the set mode to enable a user to easily check the set mode.

An example of the normal setting informing pattern is shown in FIG. 5(*a*). The light source 11 is blinked at a predetermined interval. An example of the initial illuminance correction setting informing pattern is shown in FIG. 5(*b*). The light source 11 is lit in a fade-in manner to be gradually lit up. Distinction of the informing patterns is not limited to these examples. Other informing patterns may be distinguished. For example, a pattern of long and short intervals of turn-on and turn-off and a pattern of light and dark may be distinguished.

Figure 2:
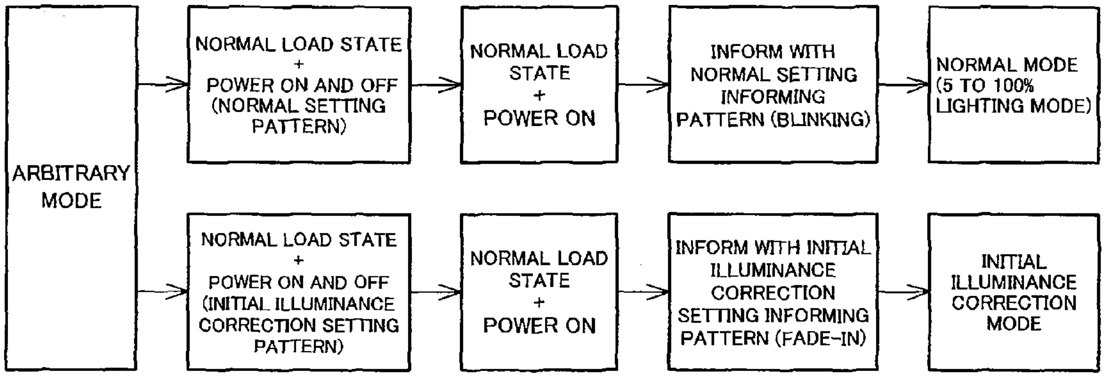
FIG. 2 is a diagram for explaining a method of setting an initial illuminance correction mode and a normal mode of the luminaire.

A method of setting the initial illuminance correction mode and the normal mode is explained with reference to FIG. 2.

For example, in a state in which the mode is set in the initial illuminance correction mode, if the initial illuminance correction mode is switched to the normal mode, the user turns on and off the switch 13 according to the normal setting pattern (see FIG. 3(*a*)).

On condition that the load detection signal is input from the load detecting circuit 20, the luminaire 10 stores, in the storing section 22, time of the power-on signal input from the power-supply monitoring circuit 19 during power-on and distinguishes the pattern from stored contents of the storing section 22. If the control circuit 18 determines that the pattern is the normal setting pattern, the control circuit 18 sets the mode in the normal mode and controls the lighting circuit 17 in the normal setting informing pattern to blink the light source 11 (see FIG. 5(*a*)). In this way, the control circuit 18 informs the user that the mode is set in the normal mode. After informing the user, the control circuit 18 controls the lighting circuit 17 in the normal mode.

In the normal mode, the control circuit 18 subjects the lighting source 17 to continuous dimming control in a range of 5% to 100% according to the input of the dimming signal from the dimmer 23 (see broken lines in FIGS. 6 and 7).

In a state in which the mode is set in the normal mode, if the normal mode is switched to the initial illuminance correction mode, the user turns on and off the switch 13 according to the initial illuminance correction setting pattern (see FIG. 3(*b*)).

On condition that the load detection signal is input from the load detecting circuit 20, the control circuit 18 of the luminaire 10 stores, in the storing section 22, time of the power-on signal input from the power-supply monitoring circuit 19 during power-on and distinguishes the pattern from stored contents of the storing section 22. If the control circuit 18 determines that the pattern is the initial illuminance correction setting pattern, the control circuit 18 sets the mode in the initial illuminance correction mode and controls the lighting circuit 17 in the initial illuminance correction setting informing pattern to light the light source 11 in a fade-in manner (see FIG. 5(*b*)). In this way, the control circuit 18 informs the user that the mode is set in the initial illuminance correction setting mode. After informing the user, the control circuit 18 controls the lighting circuit 17 in the initial illuminance correction mode.

In the initial illuminance correction mode, the control circuit 18 carries out the initial illuminance correction according to the accumulated lighting time of the light source 11 (see the solid line in FIG. 6). The control circuit 18 may subject the lighting circuit 17 to the continuous dimming control according to the input of the dimming signal from the dimmer 23 within a range of the initial illuminance correction.

If the plural luminaires 10 are connected to the switch 13 and the plural luminaires 10 are lit and lit out at the same time according to the operation of the switch 13, modes of the plural luminaires 10 are set at the same time. At this point, determination of power-on time of the setting patterns is set in a range with a slight margin. Therefore, even if there is operation fluctuation of components used in the plural luminaires 10, the modes of the plural luminaires 10 can be set at the same time.

If the luminaire 10, the mode of which is not switched, is present among the plural luminaires 10, since the normal setting pattern and the initial illuminance correction setting pattern are different, it is possible to surely switch the modes of all the luminaires 10 by turning on and off the power supply in the setting patterns corresponding to the luminaire 10 again or several times.

For example, if the initial illuminance correction mode and the normal mode are switched, it is possible to switch the initial illuminance correction mode and the normal mode in order by turning on and off the power supply in one setting pattern. However, if the plural luminaires 10 are connected to the switch 13 and the plural luminaires 10 are lit and lit out at the same time according to the operation of the switch 13, when there is the luminaire 10, the mode of which is not switched, is present, in some case, it is difficult to set all the luminaires 10 in the same mode even if the power supply is turned on and off many times in one setting pattern. Therefore, as in this embodiment, the initial illuminance correction setting pattern or the normal setting pattern is selected and the power supply is turned on and off according to whether the initial illuminance correction mode is set or the normal mode is set. Consequently, it is possible to designate and set the initial illuminance correction mode or the normal mode and surely switch the modes of all the luminaires 10.

If the plural luminaires 10 are connected to the switch 13 and the plural luminaires 10 are lit and lit out at the same time according to the operation of the switch 13 and if the light source 11 is detachably attachable to the luminaires 10, the light sources 11 of the luminaires 10, the modes of which are switched, are maintained in an attached state and the light sources 11 of the luminaires 10, the modes of which are switched, are detached to apply no load to the luminaires 10 to turn on and off the power supply in the setting patterns. Consequently, it is possible to not switch the modes of the luminaires 10 to which the light sources 11 are not attached. Therefore, it is possible to select an arbitrary luminaire 10 among the plural luminaires 10 and sets the mode in an arbitrary mode.

As explained above, with the luminaire 10 according to this embodiment, it is possible to easily set the initial illuminance correction mode or the normal mode by turning on and off the power supply for the luminaire 10. Further, it is possible to designate and set the initial illuminance correction mode or the normal mode by selecting the initial illuminance correction setting pattern or the normal setting pattern and turning on and off the power supply for the luminaire 10 according to whether the initial illuminance correction mode is set or the normal mode is set.

The luminaire 10 changes the output of the light source 11 in the initial illuminance correction setting informing pattern if the initial illuminance correction mode is set and changes the output of the light source 11 in the normal setting informing pattern different from the initial illuminance correction setting informing pattern if the normal mode is set. Consequently, the luminaire 10 can inform switching of the mode and inform in which mode the mode is set.

The luminaire 10 includes a continuous dimming function. The luminaire 10 can facilitate the switching of the initial illuminance correction mode and the normal mode while including the continuous dimming function.

If the light source 11 is detachably attachable to the luminaire 10, the mode may be set in the initial illuminance correction mode or the normal mode by turning on and off the power supply for the luminaire 10 in the initial illuminance correction setting pattern or the normal setting pattern on condition that the luminaire 10 is in a no-load state in which the light source 11 is detached from the luminaire 10. Since the luminaire 10 includes a protection circuit, no problem occurs even if the power supply is turned on in the no-load state.

In this example, as in the example explained above, if the plural luminaires 10 are connected to the switch 13 and the plural luminaires 10 are lit and lit out at the same time according to the operation of the switch 13, the light sources 11 of the luminaires 10, the modes of which are switched, are detached and the light sources 11 of the luminaires 10, the modes of which are not switched, are maintained in the attached state to turn on and off the power supply for the luminaires 10. Consequently, it is possible to not switch the modes of the luminaires 10 in the attached state of the light source 11.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A power supply device comprising:

a power supply circuit configured to produce power to light a light source from power supplied from an external power supply;

an accumulated-lighting-time storing section configured to store cumulative lighting time of the light source; and a control circuit configured to operate in an initial illuminance correction mode for performing initial illuminance correction based on the cumulative lighting time of the light source, when a pattern of turning on and off the power supplied from the external power supply is a predetermined initial illuminance correction setting pattern, and operate in a normal mode for not performing the initial illuminance correction when the pattern of turning on and off the power supplied from the external power supply is a predetermined normal setting pattern.

2. The power supply device according to claim 1, wherein the control circuit controls the lighting circuit in an initial illuminance correction setting informing pattern to change an output of the light source if the pattern of turning on and off the power supplied from the external power supply is the predetermined initial illuminance correction setting pattern and controls the lighting circuit in a normal setting informing pattern different from the initial illuminance correction setting informing pattern to change the output of the light source if the pattern of turning on and off the power supplied from the external power supply the predetermined normal setting pattern.

3. The power supply device according to claim 1, wherein the control circuit subjects the lighting circuit to continuous dimming control according to a dimming signal input from the outside while the initial luminance correction is being performed or not.

4. The power supply device according to claim 1, wherein, while in the initial illuminance correction mode, the control circuit subjects the lighting circuit to continuous dimming control according to a dimming signal input from the outside and controls a dimming upper limit to a dimming level limited by the initial illuminance correction.

5. The power supply device according to claim 1, wherein, while in the initial illuminance correction mode, the control circuit changes a current ratio.

6. The power supply device according to claim 1, wherein, when the pattern for turning on and off the power supplied from the external power supply is within a predetermined tolerance with respect to the initial illuminance correction setting pattern or the normal setting pattern, the control circuit determines the pattern is the initial illuminance correction setting pattern or the normal setting pattern.

7. The power supply device according to claim 1, wherein the control circuit determines mode switching operation, determines a mode, and checks the determined mode from the pattern for turning on and off the power supplied from the external power supply.

8. The power supply device according to claim 1, wherein, when the pattern for turning on and off the power supply from the outside is not determined as the initial illuminance correction setting pattern or the normal setting pattern within a predetermined reception time, the control circuit cancels determination of the pattern.

9. A luminaire comprising:

power supply device comprising:

a power supply circuit configured to produce power to light a light source from power supplied from an external power supply;

an accumulated-lighting-time storing section configured to store cumulative lighting time of the light source; and a control circuit configured to operate in an initial illuminance correction mode for performing initial illuminance correction based on the cumulative lighting time of the light source, when a pattern of turning on and off the power supplied from the external power supply is a predetermined initial illuminance correction setting pattern, and operate in a normal mode for not performing the initial illuminance correction when the pattern of turning on and off the power supplied from the external power supply is a predetermined normal setting pattern; and a light source.

10. A power source system comprising:

a power supply device; and a switch provided between an external power supply and the power supply device, and for turning on and off supply of the external power supply with respect to the power supply device, wherein the power supply device having a lighting circuit configured to light a light source from power supplied by the external power source, an accumulated-lighting-time storing section configured to store cumulative lighting time of the light source, and a control circuit configured to operate in an initial luminance correction mode for performing initial luminance correction corresponding to the cumulative lighting time of the light source when a pattern of turning on and off the supply of power from the external power source is a predetermined initial luminance correction setting pattern, and operate in a normal mode for not performing the initial luminance correction when the pattern of turning on and off the supply of the external power supply is a predetermined normal setting pattern.

* * * * *